United States Patent [19]

Inoue et al.

[11] 3,853,401

[45] Dec. 10, 1974

[54] ROLL DUPLICATOR FOR CONTINUOUSLY COPYING IMAGES OF AN ORIGINAL FILM ONTO A COPY FILM

[75] Inventors: Mutsuhiro Inoue, Sagamihara; Shunzo Inoue, Tokyo, both of Japan

[73] Assignee: Canon Kabushiki Kaisha, Tokyo, Japan

[22] Filed: June 23, 1971

[21] Appl. No.: 155,754

[30] Foreign Application Priority Data

June 26, 1970 Japan.............................. 45-55814

[52] U.S. Cl..................... 355/106, 355/88, 355/111
[51] Int. Cl. ........................................... G03b 27/30
[58] Field of Search ............ 355/106, 104, 88, 108, 355/109, 111; 96/49

[56] References Cited
UNITED STATES PATENTS

| | | | |
|---|---|---|---|
| 3,157,102 | 11/1964 | Pfaff .................................. | 355/111 |
| 3,230,857 | 1/1966 | Ritzerfeld et al. .................. | 355/106 |

Primary Examiner—Richard L. Moses
Attorney, Agent, or Firm—Fitzpatrick, Cella, Harper & Scinto

[57] ABSTRACT

A roll duplicator using a pre-recorded orginal film and an unsensitized copy film for continuously copying images of the original film onto the copy film. The copy film is a film such as Dylux film having a characteristic of being chromogenic for light such as ultraviolet light but losing such chromogenic property for light of longer wavelengths and that light sources for producing such different lights are provided in exposure and fixing means respectively, whereby the original and copy films are passed while overlapped through the exposure means and then only the copy film or both films are passed through the fixing means so that positive or negative images corresponding to the original images may be formed and fixed on the copy film exclusively with the aid of the lights provided by the light sources, thereby continuously copying the original film positively or negatively on the copy film at high speeds and without using any particular developing device.

7 Claims, 15 Drawing Figures

A ROLL DUPLICATOR FOR CONTINUOUSLY COPYING IMAGES OF AN ORIGINAL FILM ONTO A COPY FILM

BACKGROUND OF THE INVENTION

1. Field of the Invention

This invention relates to a roll duplicator, and more particularly to a roll duplicator of the type in which images of a master or original film are copied into negative or positive images through developing and fixing processes effected solely by light.

2. Description of the Prior Art

Recording or copying of images on a film has heretofore been accomplished by exposing the film to light carrying original images, developing and fixing to provide permanent copy images. The developing and fixing steps have involved the use of liquids as developer and fixer, which has not only complicated such processes but also accompanied an additional procedure such as washing the processed film to remove any residual developer therefrom. Such a film is typically known as the silver salt film which has long been used, but this type of film has involved a series of various steps including development, fixing, washing, drying, etc., and this has led to serious cumbersomenesss in copying procedures.

Instead of such a wet process using liquid developer and fixer, it is already known to accomplish a completely dry method of developing and fixing with the aid of heat or special lights. For example, the film known as "Kalvar film" (tradename for the product of Kalvar, Inc.) is available for use in such dry process. This film comprises a base and a high-polymer plastic emulsion containing photosensitive diazo-compound. During exposure process, Kalvar film is exposed to untraviolet rays to cause photolysis of the diazo-compound and thereby form nitrogen gas latent images, whereafter the film is heated to expand and develop the gas latent images. Subsequently, the film is exposed to uniform ultraviolet rays to cause further photolysis of undecomposed diazo-compound and thereby fix the latent images as described in U.S. Pat. No. 2,911,299.

The use of diazo-film such as Kalvar film eliminates the cumbersome procedures of washing and drying the film and simplifies the entire process of film treatment since such film enables images to be recorded thereon through a completely dry process employing heat for development and ultraviolet rays for fixing. On the other hand, however, the use of heat for development has encountered disadvantages that the lower rectilinear propagation characteristic of heat than that of light may prevent uniform destribution of heat over the surface of the film and often result in non-uniform developing effect and that using a great deal of heat for quick development is not permitted because too much heat imparted to the film at once would melt the film itself.

SUMMARY OF THE INVENTION

It is a primary object of the present invention to provide a roll duplicator which eliminates the above-mentioned disadvantages existing in the prior art.

The term "roll duplicator" used herein refers to an apparatus which uses a pre-recorded master or original film and an unexposed copy film both continuously fed and overlapped with each other to continuously print out images corresponding to those of the master film onto the copy film and thereafter subject the copy film to developing process and, if desired, to fixing process, thereby continuously duplicating the master film onto the copy film.

It is another object of the present invention to provide a roll duplicator which requires no developing device and may print out images corresponding to those of an original film with the aid of light and then fix the printed out images with the aid of light having a wavelength different from that of the first-named light.

It is a further object of the present invention to provide a roll duplicator which requires no developing device and includes light source means for printing out images corresponding to those of an original film onto a copy film and light source means for producing light of a wavelength different from that of the first-named light source to cause the copy film to lose its photosensitivity, whereby negative or positive images corresponding to the images of the original film may be provided on the copy film as desired, simply by changing the paths of the two films.

To achieve these objects, the present invention preferably employs, as the copy film, the film supplied under the tradename of "Dylux" by E. L. Dupont, U.S.A. Dylux film comprises photosensitive emulsion composed of a mixture of (A) an organic color former such as triphenylmethane coloring matter in leuco form, (B) a photo-oxidizing agent such as 2, 2'-bis(o-chlorophenyl)-4,4',5,5'-tetraphenylimidazole and (C) a photosensitive redox system which does not reduce the photo-oxidizing agent but can produce a reducing agent with the aid of light of a different wavelength to thereby reduce the photo-oxidizing agent, such as a couple of quinone and ethylene glycol. When such a film is exposed to ultraviolet light, the substance (B) absorbs the energy of the light so that the substance (A) forms color. Subsequently, when the film is exposed to light of a wavelength different from that of ultraviolet light, the substance (C) absorbs such light and reacts with a residual amount of substance (B) to destroy such substance (B) and thereby achieve fixing.

The above reaction may be represented by the following chemical reaction formula:

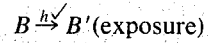
$$B \xrightarrow{h\nu} B' \text{(exposure)}$$

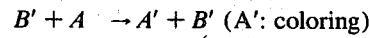
$$B' + A \rightarrow A' + B' \quad (A': \text{coloring})$$

$$C \xrightarrow{h\nu'} C'$$

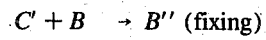
$$C' + B \rightarrow B'' \text{ (fixing)}$$

In such reaction, the absorption into $B$ and the absorption into $C$ should not occur simultaneously. For this reason, wavelengths are selected so that $B$ and $C$ may only absorb $h\nu$ and $h\nu'$, respectively. (See "Novel Imaging Systems" edited by Richard D. Murray, pp. 79–95) Thus, Dylux film can carry out all the processes with the help of light alone.

The present invention is particularly concerned with a roll duplicator used in combination with such a specific film, and intends to achieve the foregoing objects by a very simple arrangement of a light source producing a light of a wavelength range to which the film is sensible and another light source producing light of a wavelength range capable of eliminating the color forming property of the film.

The above and other objects and features of the present invention will become fully apparent from the following detailed description of embodiments thereof taken in conjunction with the accompanying drawings.

DESCRIPTION OF THE PREFERRED EMBODIMENTS

Figure 1:
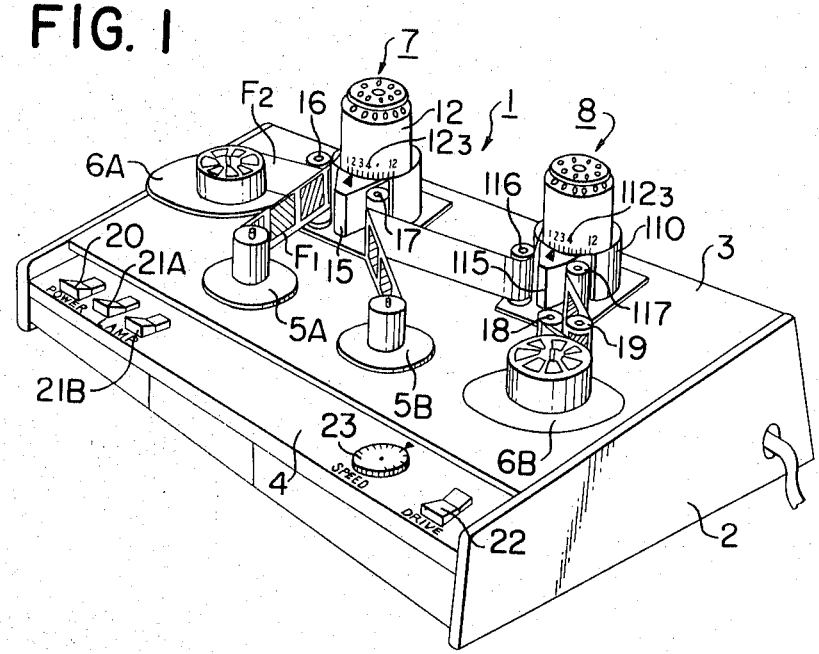
FIG. 1 is a perspective view showing the appearance of the roll duplicator according to an embodiment of the present invention.

Referring to FIG. 1, the roll duplicator according to an embodiment of the present invention is generally designated by numeral 1 and comprises a base housing 2, an upper panel 3 and an operating panel 4. On the panel 3 there are juxtaposed original film supply and take-up reels 5A and 5B. The original film supply reel 5A is loosely mounted on a fixed shaft journalled to the upper panel 3, while the original film take-up reel 5B comprises a reel flange formed integrally with a rotary shaft driven from an unshown drive motor housed within the housing 2. Copy film supply and take-up reels 6A and 6B are also provided on the upper panel 3. The copy film supply reel 6A is rotatably mounted on a fixed shaft journalled to the upper panel 3, while the copy film take-up reel 6B comprises a reel flange formed integrally with a rotary shaft driven from another unshown drive motor housed within the housing 2. On the upper panel 3 there are further provided exposure means 7 and fixing means 8, details of which are shown in FIG. 2.

Figure 2:
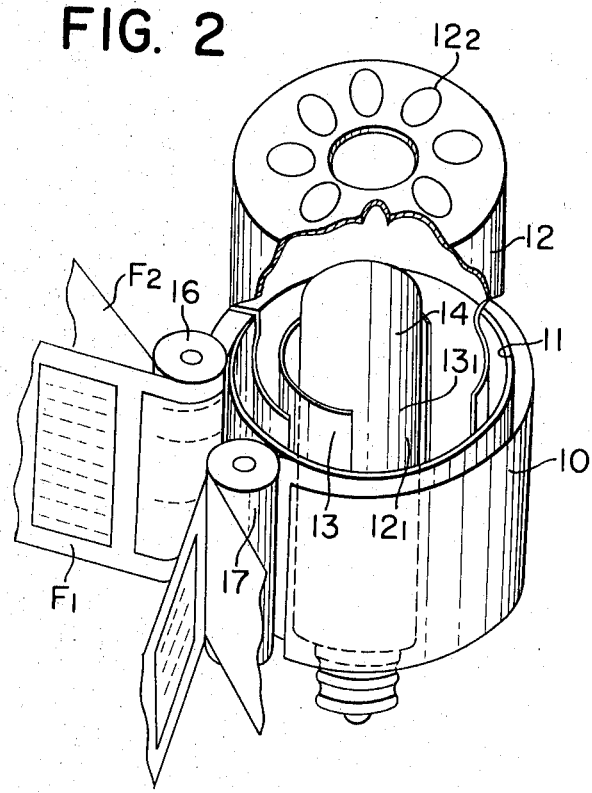
FIG. 2 is a perspective view showing the essential portion of the exposure means in the roll duplicator of FIG. 1.

Referring to FIG. 2, the exposure means 7 comprises a light-intercepting cylindrical member 10 partly cut away to provide an opening. Concentrically disposed within the light-intercepting cylindrical member 10 is a light-transmitting cylinder 11 formed of light-transmissive glass or the like. The light-transmitting cylinder 11 is designed so that the side wall thereof guides original and copy films in overlapped relationship as will be described later. Within the light-transmitting cylinder 11 there is also concentrically disposed a light-intercepting cylindrical member 12 having a slit opening $12_1$ formed in the base portion thereof which is reduced in diameter. The light-intercepting member 12 is partly projected upwardly beyond the upper end of the light-intercepting cylindrical member 10 so that it may be manually rotated, and the top end face thereof is formed with a plurality of air holes $12_2$ through which cooling air may be introduced into the member 12 by an unshown suction motor provided below the panel 3. A further light-intercepting member 13 also having an opening $13_1$ formed therein is concentrically mounted within the light-intercepting member 12 so as to intercept part of light from an exposure light source 14, which is also concentrically mounted within the member 13.

The light-intercepting member 13 is fixed to the panel 3 at the bottom end thereof, while the light-intercepting member 12, as mentioned above, is mounted for manual rotation by means of its upper projected portion. Therefore, by rotating the member 12, the slit opening $12_1$ thereof may be displaced to vary its relative position to the opening $13_1$ of the member 13 and thereby control the quantity of light passed from the light source 14.

Turning back to FIG. 1, the exposed side wall portion of the light-intercepting member 12 is provided with an exposure scale $12_3$ which cooperates with a reference index on an index member 15 fixed on the panel 3. Guide rollers 16 and 17 formed of rubber are rotatably mounted on the panel 3 in opposed relationship with the opening of the light-intercepting member 10.

Figure 4:
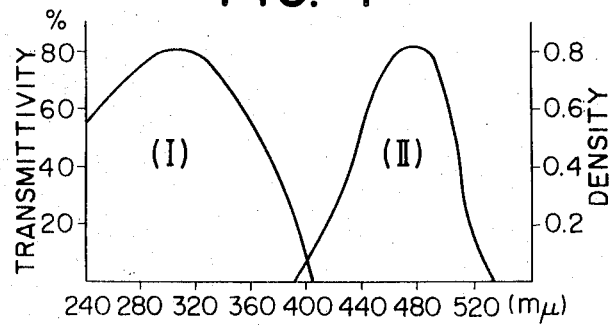
FIG. 4 is a graph for illustrating the spectral sensitivity characteristic of the copy film used with the roll duplicator of FIG. 1.

An original film F1 wound on the reel 5A is a prerecorded microfilm of silver salt or the like carrying thereon information to be copied onto a copy film designated by F2. The copy film F2 is preferably a Dylux film which has been described previously. The Dylux film has a spectral sensitivity characteristic as illustrated in FIG. 4. More specifically, color is formed when the film is exposed to the so-called ultraviolet light, i.e., light of short wavelength in the range of 240 to 400 m$\mu$. Such color forming sensitivity characteristic is shown by curve I in FIG. 4. In addition, the film loses its color forming property when exposed to light of wavelength in the range of 400 to 520 m$\mu$. Such spectral sensitivity characteristic is shown by curve II in FIG. 4.

The copy film F2 is wound on the supply reel 6A, and when it is desired to form positive images thereon, the copy film F2 is overlapped with the original film F1 at the guide roller 16 and guided together along the side wall of the light-transmitting cylinder 11 and guide roller 17. After passing the guide roller 17, the two films are parted from each other so that they may be separately taken up by their respective take-up reels 5B and 6B.

Figure 5:
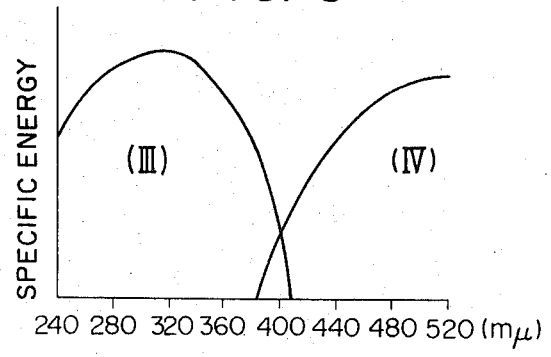
FIG. 5 is a graph for illustrating the spectral of lights produced by the light sources used in the exposure and fixing means of the roll duplicator shown in FIG. 1.

The light source 14 in the exposure means 7 may be a source of visible light having a peak visible wavelength of about 500 m$\mu$ as shown by curve IV in FIG. 5, such as color fluorescent lamp Type FL20B supplied by Matsushita Electric Industrial Co., Ltd. in Japan.

The fixing means 8 on the panel 3 is very much the same in construction as the exposure means 7 except for the wavelength of light in use, and the detailed description thereof is omitted herein. The corresponding parts of the fixing means 8 are designated by adding preffix of hundred to the number at the exposure means 7, for example, the light-intercepting member in the fixing means 8 corresponding to that 10 in the exposure means 7 is designated by 110. The light source 114 in the fixing means 8 may be a source of ultraviolet light having such a wavelength characteristic as shown by curve III in FIG. 5, for example, like black blue fluorescent lamp FL20BL-B supplied by Matsushita Electric Industrial Co., Ltd.

Driving rollers 18 and 19 formed of rubber are provided in opposed relationship on the panel 3, the roller 18 being driven from an unshown motor below the panel 3 and cooperating with the other roller 19 to transport the copy film F2 at a predetermined speed. During the film transportation, the take-up reels 5B and 6B driven from unshown motors impart a tension to the respective films F1 and F2, and when the film F2 is driven by the roller 18 the two films F1 and F2 may be taken up by the reels 5B and 6B, respectively.

Various operating members are provided on the operating panel 4, such as power switch 20 for starting a suction fan or the like below the panel 3, switches 21A and 21B for turning on the light sources 14 and 114 in the exposure and fixing means 7 and 8, film driving switch 22 for energizing the unshown respective motors below the panel 3 to drive the reels 5B, 6B and driving roller 18 to take up the films F1 and F2 on these reels respectively, and dial 23 for controlling the number of revolutions of the unshown motor for driving the driving roller 18. It should be understood that all these operating members are arranged in a conventional manner.

Description will now be made of the manner in which the above-described roll duplicator is operated for image reproduction. In order to copy the pre-recorded images of the original film F1 onto the copy film F2 with the same polarity as the original images, namely, to form negative or positive images on the copy film F2 in accordance with the negative or positive images pre-recorded on the original film F1, the two films F1 and F2 are caused to follow their respective paths as shown in FIG. 1 (more particularly, the paths as shown by solid lines in FIG. 3). The two films are overlapped with each othr in the exposure means 7, where they are guided together over the light-transmitting cylinder 11. The two films F1 and F2 are then separated from each other at the guide roller 17 so that the original film F1 goes to its take-up reel 5B while the copy film F2 travels over the guide roller 116 into fixing means 8, where the film F2 moves around the light-transmitting cylinder 111, then passes over the guide roller 117 and crosses between the drive rollers 18 and 19 and finally goes to the copy film take-up reel 6B.

Figure 6:
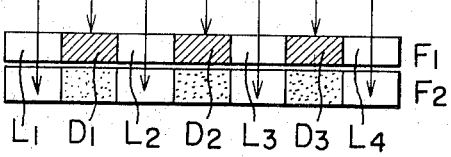
FIGS. 6A, B and C illustrate the manner in which positive copy images are formed by the use of the roll duplicator of FIG. 1.

Depression of the switches 20, 21A, 21B and 22 moves the two films and turns on the light sources 14 and 114 in the exposure and fixing means 7 and 8. As the two films F1 and F2 move round while overlapped through the exposure means 7, the light source 14 therein illuminates the original film F1 so that light passes to the copy film F2 through the light regions $L_1$–$L_4$ of the images on the original film F1, as schematically illustrated in FIG. 6, wherein the copy film F2 is shown at A. Due to the visible light from the light source 14, the regions of the copy film F2 corresponding to the light regions $L_1$–$L_4$ of the original film F1 lose their photosensitivity, that is, their color forming property (see FIG. 6B). Subsequently, the copy film F2 is exposed to uniform violet light from the light source 114 in the fixing means 8 so that the other regions of the copy film F2 corresponding to the dark regions $D_1$–$D_4$ of the original film F1 form color (see FIG. 6C) since the color forming property is still retained in such regions of the copy film. Thus, positive images corresponding to the images on the original film F1 are formed on the copy film F2. In this case, if the images of the originally film F1 are of low density, the light-intercepting member 12 or 112 may be manually rotated so as to control the width of the slit opening defined between the member 12 or 112 and the fixed light-intercepting member 13 or 113 to vary the quantity of light passed from the light source 14 or 114 to the copy film F2 and thereby adjust the density of copy images.

Figure 3:
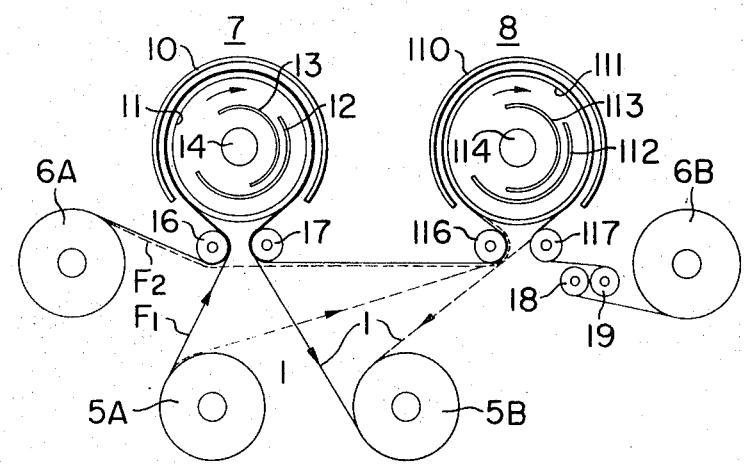
FIG. 3 is a schematic diagram for illustrating the paths of film in the roll duplicator of FIG. 1.

To produce negative copy images corresponding to the original images, the original and copy films F1 and F2 are caused to follow the paths as indicated by broken lines in FIG. 3. That is, the two films F1 and F2 are overlapped with each other around the light-transmitting cylinder 111 in the fixing means 8 and then taken up by respective take-up reels 5B and 6B. In this case, the original film F1 as it is overlapped with the copy film F2 is exposed to ultraviolet light from the light source 114 so that, as shown in FIG. 7B the regions of the copy film F2 corresponding to the light regions $L_1$–$L_4$ of the original film F1 form color to provide negative copy images corresponding to the images of original film F1 on Film F2. Subsequently, the copy film F1 now carrying thereon copy images is wound onto the take-up reel 6B so that those formed images can be fixed by visible light such as ordinary indoor light, without the need to be specially exposed to any visible light of high intensity.

Figure 8:
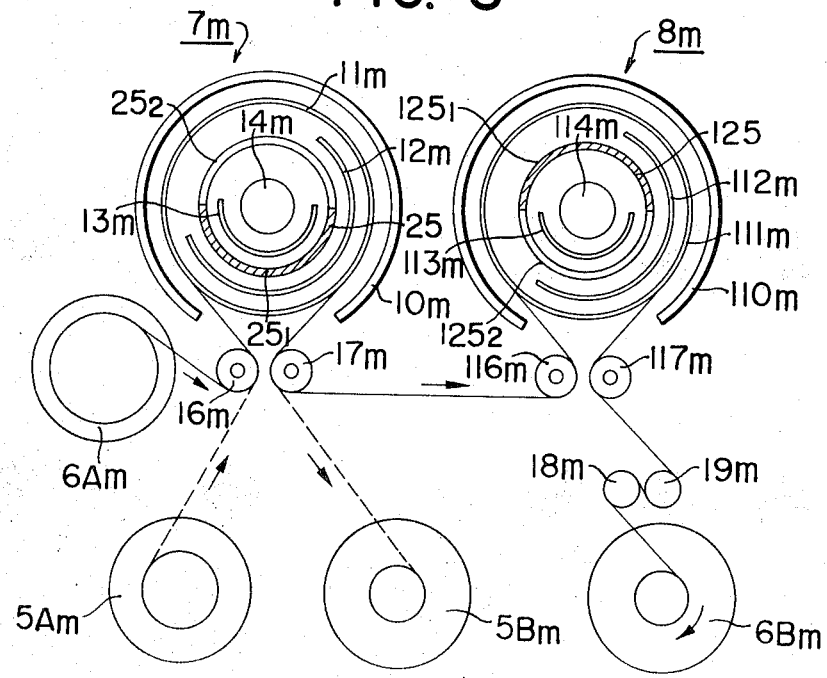
FIG. 8 is a top plan view showing the essential portion of modified roll duplicator according to the present invention.
Figure 9:
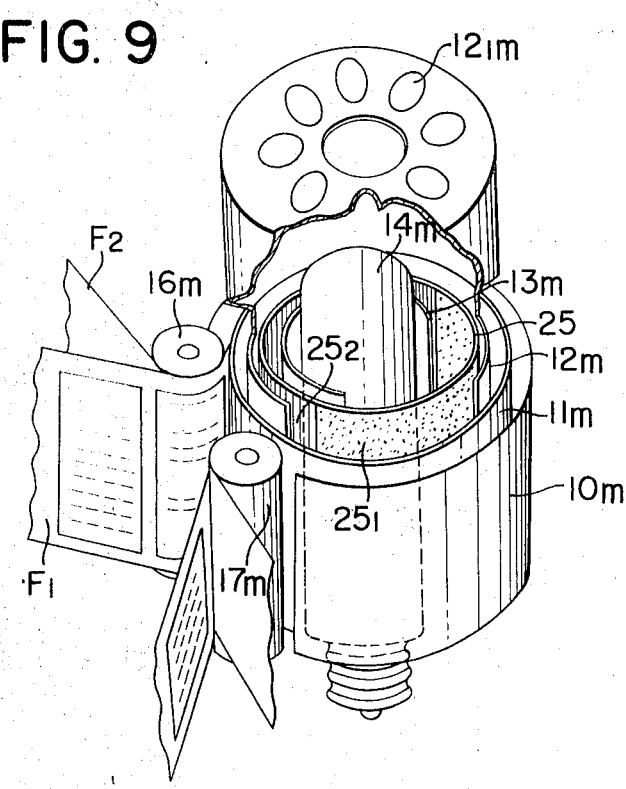
FIG. 9 is a perspective view showing the essential parts of the exposure or fixing means incorporated in the roll duplicator of FIG. 8.
Figure 10:
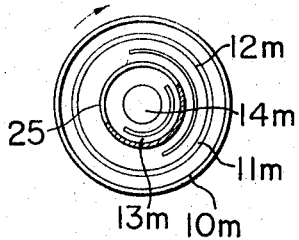
FIG. 10 is a top plan view of the exposure or fixing means of FIG. 9.
Figure 11:
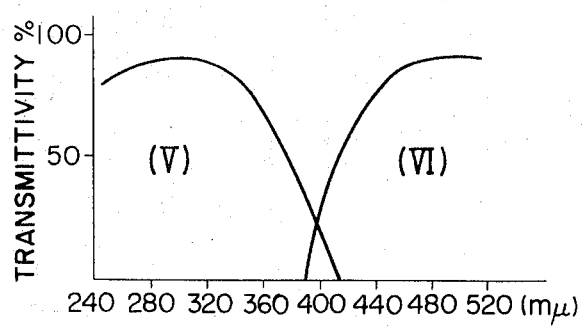
FIG. 11 is a graph for illustrating the spectral transmitting characteristic of the filter used in the exposure or fixing means of FIG. 9.

FIG. 8 shows another embodiment of the roll duplicator according to the present invention. This alternative embodiment is similar in basic construction to the roll duplicator of FIG. 1, and therefore description will be made only of its difference from the previous embodiment. For the purpose of clarity, the parts of this embodiment corresponding to those of the FIG. 1 embodiment are designated by similar numerals suffixed with letter $m$, such as $14m$ for a light source corresponding to the light source 14. A first difference of the roll duplicator of FIG. 8 from that of FIG. 1 is that light sources $14m$, $114m$ are sources of light in a wide wavelength range from ultraviolet to visible light, such as mercury lamp Type N400G supplied by Mitsubishi Electric Industrial Co., Ltd. and that cylindrical filters 25 and 125 are interposed between light-intercepting members 12 and 13 and between light-intercepting members 112 and 113, respectively. Filters 25 and 125 are similar to each other. As is typically shown in FIG. 9, the filter 25 (or 125) is in the form of a cylinder which comprises two cylinder halves $25_1$ and $25_2$ (or $125_1$ and $125_2$) formed of different materials having such transmission factors as shown by curves V and VI in FIG. 11, and is rotatably mounted between the light-intercepting members 12 and 13 (or 112 and 113). More specifically, the filter half $25_1$ ($125_1$) of the filter 25 (125) has a filter characteristic of exclusively transmitting ultraviolet light, i.e., light of short wavelength (see FIG. 11, curve $v$), while the other filter half $25_2$ ($125_2$) has a filter characteristic of transmitting visible light alone (see FIG. 11, curve VI).

Such roll duplicator is operated for copying process in a manner described hereunder. In order to provide negative copy images corresponding to the images of the original film F1, two films F1 and F2 are caused to follow the same paths as those in the embodiment of FIG. 1. That is, the two films F1 and F2 are overlapped with each other in the exposure means 7m where they are guided together over the light-transmitting cylinder 11m, and then the original film F1 is taken up by the take-up reel 5Bm as shown by a broken line while the copy film F2 is further moved into the fixing means 8m where it is guided over the light-transmitting cylinder 111m, and finally taken up by the take-up reel 6Bm.

In this case, it should be moted that the filters 25 and 125 must be previously so positioned that their filter halves $25_2$ and $125_1$ are opposed to the slits defined between the light-intercepting members 12m and 13m and between the light-intercepting members 112m and 113m so as to ensure the films F1 and F2 overlapped in the exposure means 7m to be illuminated by visible light and the film F2 moving in the fixing means 8m to be exposed to ultraviolet light. With the filters 25 and 125 so positioned, positive copy images corresponding to the original images on the film F1 may be provided on the copy film F2 in the manner illustrated in FIG. 6.

In order to provide negative copy images, the respective films F1 and F2 are continuously guided along the paths as indicated by solid lines and broken lines in FIG. 8. In this case, however, the filters 25 and 125 should be previously rotated 180° from the position of FIG. 8 so that the filter halves $25_1$ and $125_2$ of the filters are opposed to the slit openings defined between light-intercepting members 12m and 13m and between light-intercepting members 112m and 113m.

Figure 7:
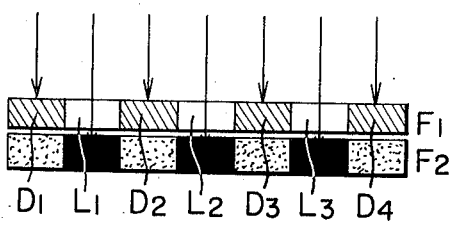
FIGS. 7A, B and C illustrate the manner in which negative copy images are formed by the use of the same duplicator.

With the position of the filters 25 and 125 so varied, the original and copy films F1 and F2 overlapped in the exposure means 7m may be illuminated by ultraviolet light through the filter half $25_7$, whereafter in the fixing means 8m the copy film F2 may be exposed to visible light through the filter part $125_2$. As a result, negative images corresponding to those on the original film F1 may be provided on the copy film F2 as shown in FIG. 7 and such copy images may be fixed thereon.

Figure 12:
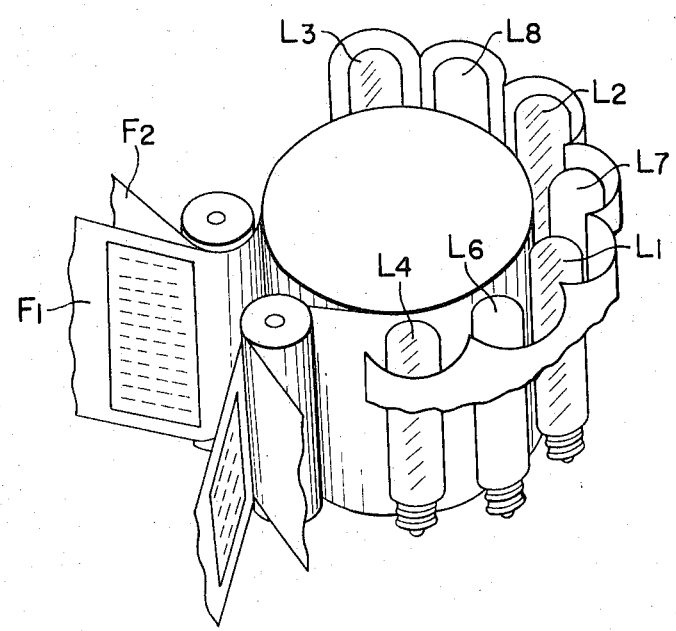
FIGS. 12 and 13 are perspective and top plan views showing a modified form of the exposure or fixing means in the roll duplicator of FIGS. 1 or 9.
Figure 13:
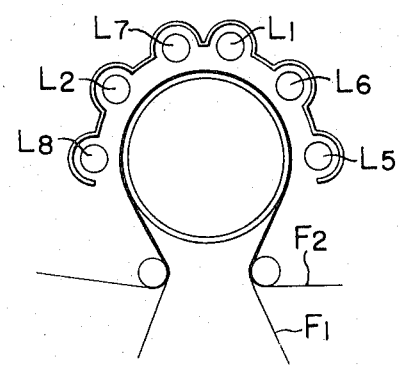

In the roll duplicator of FIG. 8, the filters 25 and 125 have been shown as rotatable to selectively provide lights of desired wavelengths from the light sources, where as the same result as described above could be achieved by eliminating the filters and replacing the light sources 14 (14m) and 114 (114m) with sources of ultraviolet rays $L_1$–$L_4$ and sources of visible light $L_5$–$L_8$ disposed between the outermost light-intercepting member (such as 10, 10m, 110 110m) and the light-transmitting cylinder (such as 11, 11m, 111, 111m), as shown in FIGS. 12 and 13, thereby selectively turning on such light sources in accordance with the positive or negative of the copy images to be formed.

Although the copy film has been shown and described as commercially available Dylux film which allows images to be formed and fixed by exposure to light, it will be apparent that the present invention also permits the use of any other film which can provide image reproduction exclusively by exposure to light.

As has been described hitherto, the present invention can provide a highly useful and practical roll duplicator in which continuous image reproduction can be achieved by using, in combination, a pre-recorded film and a film capable of forming and fixing images thereon exclusively by exposure to light and negative or positive images can be selectively obtained simply by changing the paths of the films, and which is very simple to operate and able to perform high-speed image reproduction merely by increasing the brightness of the light sources.

We claim:

1. A roll duplicator for continuously copying images of an original film onto a copy film, comprising:
    supply reel means for carrying thereon a roll of copy film, said copy film being able to form color by light of a first wavelength range and losing its color forming property by light of a second wavelength range different from said first wavelength range;
    first exposure means including a first light source for producing light of said first wavelength range, and first guide means for guiding said copy and original films in overlapped relationship through an area illuminated by a flux of light produced by said first light source;
    second exposure means provided downstream of said first exposure means in the direction of movement of said copy film, said second exposure means including a second light source for producing light of said second wavelength range, and second guide means for guiding at least said copy film through an area illuminated by a flux of light produced by said second light source;
    take-up reel means for winding thereon said copy film; and
    copy film driving means including a member for driving said take-up reel means and said copy film so as to continuously transport said copy film from said supply reel means to said take-up reel means;
    whereby said copy film and said original film may be guided while overlapped through said first exposure means, whereafter either said copy film may be singly guided through said second exposure means or both of said copy film and said original film may be guided while overlapped through said second exposure means, so that positive or negative images corresponding to the images on said original film may be continuously formed and fixed on said copy film through exposure processes provided by said first and second exposure means.

2. A roll duplicator as defined in claim 1, wherein each of said first and said second exposure means includes a stop member for adjusting quantity of light interposed between their respective light sources and their respective guide means, whereby said two exposure means may be operated in a controlled manner.

3. A roll duplicator as defined in claim 1, wherein each of said first and said second guide means comprises a light-transmitting cylinder within which each of said light sources is disposed.

4. A roll duplicator for continuously copying images of an original film onto a copy film, comprising:
    supply reel means for carrying thereon a roll of copy film capable of forming color by light of a first wavelength range and losing its color forming property by light of a second wavelength range different from said first wavelength range;

first exposure means including a first light source for producing light of said first wavelength range and light of said second wavelength range, first guide means for guiding said copy and original films in overlapped relationship through an area illuminated by a flux of light produced by said first light source, and filter means interposed between said first guide means and said first light source, said filter means having a first filter member for exclusively transmitting light of said first wavelength range and a second filter member for exclusively transmitting light of said second wavelength range, said first and second filter members being selectively disposed in the area illuminated by said first light source and between said first light source and said first guide means;

second exposure means including a second light source for producing light of said second wavelength range and light of said first wavelength range, second guide means for guiding said copy film through an area illuminated by a flux of light produced by said second light source, and filter means interposed between said second guide means and said second light source, said filter means having a third filter member for exclusively transmitting light of said second wavelength range and a fourth filter member for exclusively transmitting light of said first wavelength range, said third and fourth filter members being selectively disposed in the area illuminated by said second light source and between said second light source and said second guide means;

take-up reel means for winding thereon said copy film; and copy film driving means including a member for driving said take-up reel means and said copy film so as to continuously transport said copy film from said supply reel means to said take-up reel means;

whereby said copy film and said original film may be guided while overlapped through said first exposure means, whereafter said copy film may be guided through said second exposure means while the filter members of said first and said second filter means are selectively positioned in place in said first and second exposure means, respectively, so that positive or negative images corresponding to the images on said original film may be continuously formed and fixed on said copy film only through said two exposure means.

5. A roll duplicator as defined in claim 4, wherein each of said first and second guide means comprises a light-transmitting cylinder within which each of said light sources is disposed, and each of said first and second filter means comprises a cylindrically-shaped member interposed between each of said light source and each of said guide means, the circumference of said cylindrically-shaped member forming said two filter members of said respective filter means.

6. A roll duplicator for continuously copying images of an original film onto a copy film, comprising:

supply reel means for carrying thereon a roll of copy film capable of forming color by light of a first wavelength range and losing its color forming property for light of a second wavelength range different from said first wavelength range;

first exposure means including a light source comprising a first luminous lamp for producing light of said second wavelength range and a second luminous lamp for producing light of said first wavelength range, first guide means for guiding said copy and original films in overlapped relationship through an area illuminated by a flux of light produced by said first light source, and filter means interposed between said first guide and said first light source, said filter means having a first filter member for exclusively transmitting light of said first wavelength range and a second filter member for exclusively transmitting light of said second wavelength range, said first and second filter members being selectively disposed in the area illuminated by said first light source and between said first light source and said first guide means;

second exposure means including a second light source comprising a third luminous lamp for producing light of said first wavelength range and a fourth luminous lamp for producing light of said second wavelength range, second guide means for guiding said copy film through an area illuminated by a flux of light produced by said second light source, and filter means interposed between said second guide means and said second light source, said filter means having a third filter member for exclusively transmitting light of said second wavelength range and a fourth filter member for exclusively transmitting light of said first wavelength range, said third and fourth filter members being selectively disposed in the area illuminated by said second light source and between said second light source and said second guide means;

take-up reel means for winding thereon said copy film, copy film driving means includig a member for driving said take-up reel means and said copy film so as to continuously transport said copy film form said supply reel means to said take-up reel means;

whereby said copy film and said original film may be guided while overlapped through said first exposure means, whereafter said copy film may be guided through said second exposure means while said luminous lamps in said first and second exposure means are selectively turned on respectively, so that positive or negative images corresponding to the images on said original film may be continuously formed and fixed on said copy film only through said two exposure means.

7. A roll duplicator as defined in claim 1, wherein said first and second guide means each comprises a transparent cylinder having a light source dispose therein.

* * * * *

UNITED STATES PATENT OFFICE
CERTIFICATE OF CORRECTION

Patent No. 3,853,401  Dated December 10, 1974

Inventor(s) MUTSUHIRO INOUE and SHUNZO INOUE

It is certified that error appears in the above-identified patent and that said Letters Patent are hereby corrected as shown below:

Column 1, line 25, "cumbersomenesss" should read
--cumbersomeness--;

Column 1, line 35, "untraviolet" should read
--ultraviolet--;

Column 1, line 53, "destribution" should read
--distribution--;

Column 5, line 3, "preffix" should read
--prefix--;

Column 5, line 47, "othr" should read
--other--;

Column 6, line 11, "originally" should read
--original--;

Column 7, line 16, "moted" should read
--noted--;

Column 7, line 42, "$25_7$" should read
--$25_1$--;

Column 10, line 42, "includig" should read
--including--;

Column 10, line 44, "form" should read
--from--.

Signed and sealed this 1st day of April 1975.

(SEAL)
Attest:

RUTH C. MASON
Attesting Officer

C. MARSHALL DANN
Commissioner of Patents
and Trademarks